(12) United States Patent
Buie, Jr.

(10) Patent No.: US 6,804,093 B2
(45) Date of Patent: Oct. 12, 2004

(54) APPARATUS AND METHOD FOR PROTECTING GROUNDING ELECTRODE CONDUCTORS FROM OVERCURRENTS

(76) Inventor: Lonnie L. Buie, Jr., 6 Breezewood Dr., Maumelle, AR (US) 72113

( * ) Notice: Subject to any disclaimer, the term of this patent is extended or adjusted under 35 U.S.C. 154(b) by 449 days.

(21) Appl. No.: 10/044,598

(22) Filed: Jan. 10, 2002

(65) Prior Publication Data

US 2002/0060891 A1 May 23, 2002

Related U.S. Application Data

(63) Continuation-in-part of application No. 09/492,223, filed on Jan. 27, 2000, now abandoned.

(51) Int. Cl.$^7$ ................................................. H02H 3/00
(52) U.S. Cl. .............................. 361/42; 361/44; 361/45; 361/93.1; 361/104
(58) Field of Search ............................. 361/42, 44, 45, 361/56, 93.1, 111, 104, 118

(56) References Cited

U.S. PATENT DOCUMENTS

| | | | |
|---|---|---|---|
| 3,818,282 A | * | 6/1974 | Buxton et al. ............... 361/627 |
| 5,179,491 A | * | 1/1993 | Runyan ........................ 361/45 |
| 5,191,502 A | * | 3/1993 | Epstein et al. ............... 361/111 |
| 5,214,314 A | * | 5/1993 | Dillard et al. ............... 307/147 |
| 6,266,233 B1 | * | 7/2001 | O'Regan ..................... 361/659 |

* cited by examiner

Primary Examiner—Stephen W. Jackson
(74) Attorney, Agent, or Firm—Mark Rogers; Gary N. Speed

(57) ABSTRACT

A safe method and apparatus for interrupting electric utility ground and open neutral fault currents and isolating customer's grounding system from utility's neutral utilizing thermal-magnetic circuit breaker pole(s) (18) electrically connected between the neutral bus/lug(s) (38) and the equipment ground bus/lug(s) (32). In addition the grounding electrode conductor (26) is connected directly to the equipment ground bus/lug(s) (32). The method of overcurrent protection for grounding electrode conductors is applicable to electrical installations where from one to six main circuit breakers are used. Circuit breaker enclosure(s) (10) are bonded to the equipment ground bus/lug(s) (32). This method is applicable to load centers, panelboards, and switchboards rated 600 volts or less, single phase or three phase. Ampere ratings vary from 20 amperes to 4,000 amperes. Short circuit ratings vary from 10,000 to 200,000 RMS symmetrical amperes.

20 Claims, 8 Drawing Sheets

| LEGEND ||
|---|---|
| SYMBOL | DESCRIPTION |
| :) | THERMAL-MAGNETIC CIRCUIT BREAKER |
| — | CONDUCTOR |
| ⏚ | GROUNDING ELECTRODE |
| • | ELECTRICAL CONNECTION |
| ▭ | BUS |
| AWG | AMERICAN WIRE GAUGE |
| kcmil | MILLION CIRCULAR MILS |

FIGURE 1

TABLE

| SIZE OF GROUNDING ELECTRODE CONDUCTOR | | AMPERE RATING OF CIRCUIT BREAKER POLE FOR PROTECTION OF GROUNDING ELECTRODE CONDUCTOR |
|---|---|---|
| COPPER | ALUMINUM OR COPPER-CLAD ALUMINUM | |
| NO. 8 AWG | NO. 6 AWG | 50 AMP |
| NO. 6 AWG | NO. 4 AWG | 60 AMP |
| ——— | NO. 3 AWG | 70 AMP |
| NO. 4 AWG | ——— | 80 AMP |
| ——— | NO. 2 AWG | 90 AMP |
| NO. 3 AWG | NO. 1 AWG | 100 AMP |
| NO. 2 AWG | NO. 1/0 AWG | 110 AMP |
| NO. 1 AWG | NO. 2/0 AWG | 125 AMP |
| NO. 1/0 AWG | NO. 3/0 AWG | 150 AMP |
| NO. 2/0 AWG | NO. 4/0 AWG | 175 AMP |
| NO. 3/0 AWG | 250 kcmil | 200 AMP |
| NO. 4/0 AWG | 300 kcmil | 225 AMP |
| 250 kcmil | 350 kcmil | 250 AMP |
| 300 kcmil | 400 kcmil | 250 AMP |
| 350 kcmil | 500 kcmil | 300 AMP |
| 400 kcmil | 600 kcmil | 300 AMP |
| 500 kcmil | 700 kcmil | 350 AMP |
| ——— | 750 kcmil | 350 AMP |
| ——— | 800 kcmil | 350 AMP |
| 600 kcmil | 900 kcmil | 400 AMP |
| ——— | 1000 kcmil | 400 AMP |
| 700 kcmil | 1250 kcmil | 450 AMP |
| 750 kcmil | ——— | 450 AMP |
| 800 kcmil | ——— | 450 AMP |
| 900 kcmil | 1500 kcmil | 500 AMP |
| 1000 kcmil | 1750 kcmil | 500 AMP |
| 1250 kcmil | 2000 kcmil | 500 AMP |
| 1500 kcmil | ——— | 600 AMP |
| 1750 kcmil | ——— | 600 AMP |
| 2000 kcmil | ——— | 600 AMP |

FIGURE 3

APPARATUS AND METHOD FOR PROTECTING GROUNDING ELECTRODE CONDUCTORS FROM OVERCURRENTS

CROSS-REFERENCE TO RELATED APPLICATIONS

This application is a continuation-in-part of U.S. application Ser. No. 09/492,223, filed Jan. 27, 2000, abandoned.

BACKGROUND

1. Field of Invention

This invention provides a safe means and method for protecting customer's grounding electrode conductors from electric utility ground and open neutral fault currents.

2. Description of Prior Art

Prior art is fully described in the National Electrical Code. The National Electrical Code does not provide an overcurrent protective device for grounding electrode conductors. The Grounding electrode conductors are connected directly from the grounding electrode to the neutral.

Ground faults and/or open neutrals on the electric utility's system, on the line side of the customer's main service, and on customer's electrical equipment have resulted in an overcurrent protective device for grounding electrode conductors. The grounding electrode conductors are connected directly from the grounding electrode to the neutral.

Ground faults and/or open neutrals on the electric utility's system, on the line side of the customer's main service, and on customer's electrical equipment have resulted in fault currents returning to the system neutral via the (1) earth, (2) grounding electrode, and (3) grounding electrode conductor. Many times these currents are sufficiently large enough to overheat and even melt the grounding electrode conductor and/or neutral conductor. Fires have resulted from the overheating and/or melting of the grounding electrode conductor and/or neutral conductor. Prior art has not prevented these fires and provides no absolute method for positively preventing these fires.

In prior art, the electric utility system's or customer's overcurrent protective devices were relied upon to sense the fault and clear it. However, the settings and sizes of overcurrent devices of the utility's system are set to protect the utility's system equipment only. When setting or selecting these overcurrent devices, no consideration is given to protecting the customers grounding electrode conductor from overcurrents due to utility system ground faults or open neutrals.

The electric utility's neutrals most often have ampacities larger than the ampacity of a No. 6 copper wire, the most common size of the grounding electrode conductors of customers. To provide the required customer load, the electric utility, in most cases cannot size their overcurrent protective devices small enough to prevent overcurrents on the customer's grounding electrode conductor or neutral conductor.

Likewise, grounding electrode conductors on customer transformers and services are not protected by overcurrent protection on the grounding electrode conductors. Feeder and branch circuit breakers are not sized to prevent overcurrents on grounding electrode conductors at transformers and services.

SUMMARY

In accordance with the present invention an overcurrent device is installed between the neutral and the grounding electrode conductor at the service equipment and at the first overcurrent protection downstream of transformers.

OBJECTS AND ADVANTAGES

Accordingly besides the objects and advantages of the method of overcurrent protection described in my above patent, several objects and advantages of the present invention are:

(a) to provide a superior method to protect electric utility customer's grounding electrode conductors from overcurrents resulting from electric utility ground faults and open neutrals;

(b) to provide a superior method to protect grounding electrode conductors from overcurrents resulting from ground faults and open neutrals on the customer's service entrance conductors and equipment on the line side of the service equipment;

(c) to prevent fires due to overcurrents on grounding electrode conductors;

(d) to prevent the loss of property and lives from fires originating from overcurrents on grounding electrode conductors;

(e) to provide a method of overcurrent protection which is safe when the overcurrent protection device trips; and (f) to provide an additional level of safety from ground faults.

Further objects and advantages are to provide a positive method of overcurrent protection of grounding electrode conductors which can be used easily and is inexpensive to manufacture in various ampere ratings to achieve the required protection. Still further objects and advantages will become apparent from a consideration of the following description and drawings.

DRAWING FIGURES

The drawings contain a legend, electrical schematics, table, elevation of a panel, a section of a panel, end views of a panel, top and bottom views of a panel.

FIG. 1 shows a legend of the graphic symbols used in FIG. 2 and FIG. 4, and a legend of the abbreviations used in FIG. 3.

FIG. 3 shows a table indicating the ampere rating of the overcurrent protective pole for various sizes and types of grounding electrode conductors.

Figure 2:
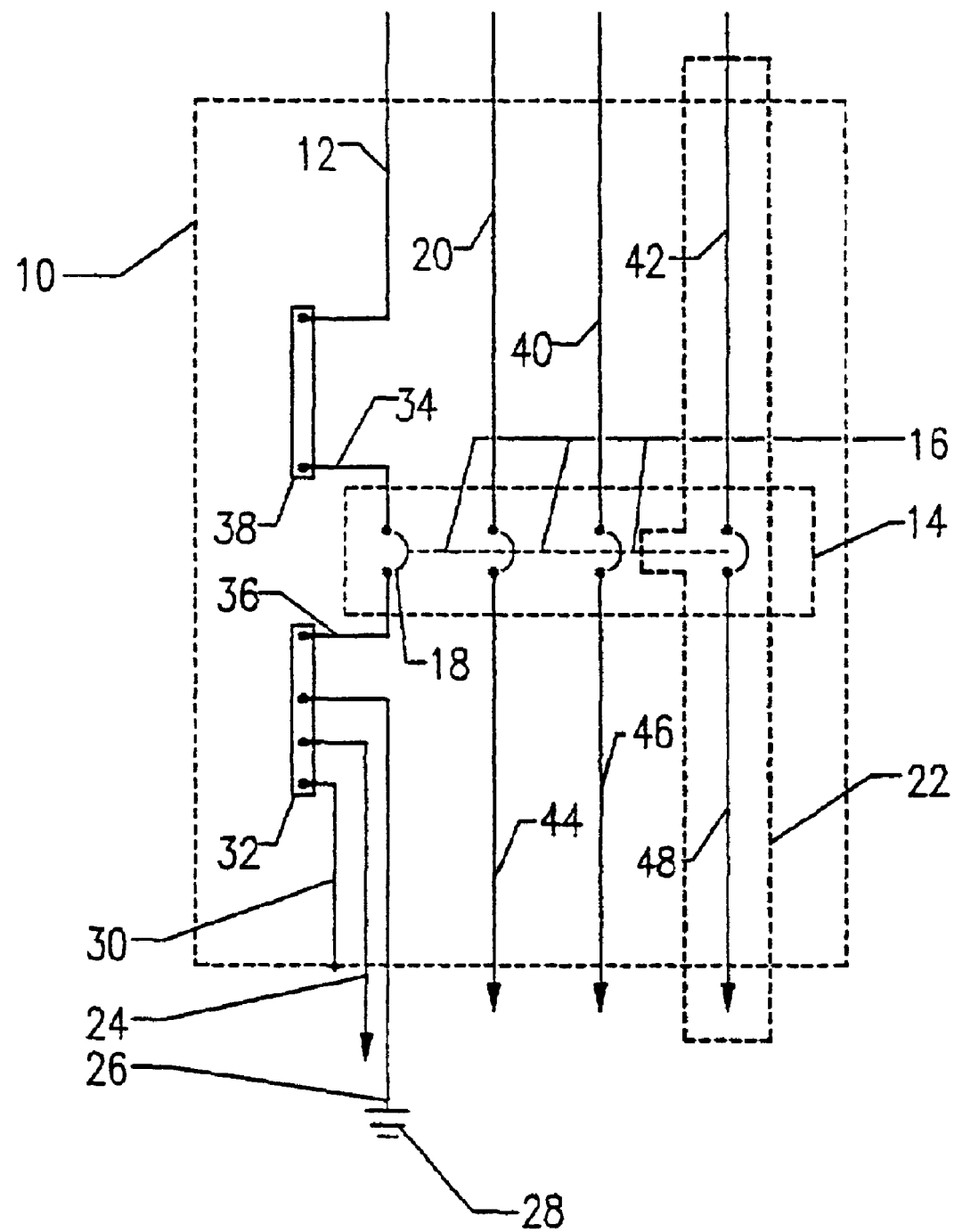
FIG. 2 show an electrical schematic of the method of providing overcurrent protection within a typical customer's service equipment with main circuit breaker.

REFERENCE NUMERALS IN DRAWINGS 10 enclosure
12 neutral conductor
14 main thermal-magnetic circuit breaker
16 mechanical linkage/handle tie
18 thermal-magnetic circuit breaker installed in bonding jumper between neutral and equipment ground bus/lug serving as utility fault interrupter and isolator 20 Line No. 1 conductor of single phase/three wire system, or a Phase A conductor of three phase/four wire system
22 Phase C thermal-magnetic circuit breaker pole for three phase/four wire system
24 equipment grounding conductors
26 grounding electrode conductor
28 grounding electrode
30 enclosure bonding conductor
32 equipment ground bus/lug
34 bonding conductor between neutral and utility fault interrupter and isolator
36 bonding conductor between equipment ground bus/lug and utility fault interrupter and isolator
38 insulated neutral bus/lug
40 Line No. 2 conductor of single phase/three wire system, or Phase B conductor of three phase/four wire system
42 Phase C conductor of three phase/four wire system
44 Line No. 1 load conductor/bus of single phase/three wire system, or Phase A load conductor/bus of three phase/four wire system,
46 Line No. 2 load conductor/bus of single phase/three wire system, or Phase B load conductor/bus of three phase/four wire system
48 Phase C load conductor of three phase/four wire system
50 Utility fault interrupter and isolator of main circuit breaker #1
52 Utility fault interrupter and isolator of main circuit breaker #2
54 Utility fault interrupter and isolator of main circuit breaker #3
56 Utility fault interrupter and isolator of main circuit breaker #4
58 Utility fault interrupter and isolator of main circuit breaker #5
60 Utility fault interrupter and isolator of main circuit breaker #6
62 Tap conductor between neutral and utility fault interrupter and isolator of main circuit breaker #1
64 Tap conductor between neutral and utility fault interrupter and isolator of main circuit breaker #2
66 Tap conductor between neutral and utility fault interrupter and isolator of main circuit breaker #3
68 Tap conductor between neutral and utility fault interrupter and isolator of main circuit breaker #4
70 Tap conductor between neutral and utility fault interrupter and isolator of main circuit breaker #5
72 Tap conductor between neutral and utility fault interrupter and isolator of main circuit breaker #6
74 Tap conductor between equipment ground and utility fault interrupter and isolator of main circuit breaker #1
76 Tap conductor between equipment ground and utility fault interrupter and isolator of main circuit breaker #2
78 Tap conductor between equipment ground and utility fault interrupter and isolator of main circuit breaker #3
80 Tap conductor between equipment ground and utility fault interrupter and isolator of main circuit breaker #4
82 Tap conductor between equipment ground and utility fault interrupter and isolator of main circuit breaker #5
84 Tap conductor between equipment ground and utility fault interrupter and isolator of main circuit breaker #6
86 Service entrance in conduit to power panel, 120/120 volts, single phase, three-wire, conforming to Article 230 of the National Electrical Code, but typically three No. 3/0 AWG Type THW copper conductors within a 1½" rigid metal conduit
87 Locknut
88 Line conductor conforming to Article 230 of the National Electrical Code but typically a No. 3/0 AWG Type THW copper conductor rated 600 volts
92 Neutral conductor conforming to Article 230 of the National Electrical Code but typically a No. 3/0 AWG Type THW copper conductor rated 600 volts
94 Main bonding jumper conforming to Article 250.28 of the National Electrical Code but typically a No. 4 AWG Type THW copper conductor rated 600 volts
96 Neutral bus (bare copper bar) mounts in the panel cabinet on plastic insulator to electrically isolate bar from panel cabinet
98 Insulated branch circuit neutral conductor conforming to Article 310 of the National Electrical Code but typically a No. 12 AWG Type THWN copper condcutor rated 600 volts
100 Insulated branch circuit line conductor conforming to Article 310 of the National Electrical Code but typically a No.12 AWG Type THWN copper conductor rated 600 volts Green insulated equipment ground conductor conforming to Article 310 of the National Electrical Code but typically a No. 12 AWG Type THWN copper conductor rated 600 volts
104 Branch circuit conductors in metal conduit to power branch circuit load, typically 3 No.12 AWG Type THWN copper conductors in ½" metal conduit
106 No. 6 AWG Type THW copper grounding electrode conductor rated 600 volts
108 Grounding electrode conductor in ½" metal conduit
110 Equipment ground copper bar bonded to panel cabinet for termination of equipment ground conductors and main bonding jumper
112 Galvanized steel cabinet, the size of the wiring gutters and gauge of steel will be in accordance with NEMA Standards Publication and U.L. standards No.67 for electrical panelboards. This cabinet will be a NEMA 1, flush or surface mounted enclosure or a NEMA 3R surface mounted enclosure
114 Utility fault interrupter and isolator consisting of a 60 ampere/single pole/120 volt thermal-magnetic molded case circuit breaker with input and output lugs for No.4 AWG copper conductors. This circuit breaker is mounted vertically on plastic insulated barrier. Short circuit rating of circuit breaker is 10,000 RMS symmetrical amperes interrupting capacity.
116 Molded case circuit breaker handle tie mechanically interlocking main circuit breaker handle to utility fault interrupter/isolator handle. Handle tie assures that when either circuit breaker trips, both circuit breakers trip.
118 200 Ampere/2 pole/240 volt main thermal-magnetic molded case circuit breaker with short circuit rating of 10,000 RMS symmetrical amperes interrupting capacity. This main circuit breaker is vertically mounted with incoming lugs for No. 3/0 AWG copper conductors.
120 Branch thermal-magnetic molded case branch circuit breaker, plug-in or bolt-on, rated 120 volt/1 pole or 240 volt/2 pole, Branch circuit breakers range in sizes from 15 amperes to 100 amperes and have short circuit ratings of 10,000 RMS symmetrical amperes interrupting capacity. Branch circuit breakers are mounted horizontally to interior pan and to vertical copper bus bars.

122 Four (4) mounting holes are provided to attach cabinet to vertical surface

124 Six (6) mounting holes are provided to attach front cover to cabinet

126 Cabinet side view (other side is mirror image of this side) Concentric knockout (1", 1¼", 1 1/2", 2") for service entrance conduit

128 Cabinet lip for NEMA 3R cabinets only

132 Cabinet cover plate with openings shown. Cover is made of painted steel. Steel gauge conforms to NEMA Standards Publication and U.L. Standards No.67 for electrical panelboards

134 Main circuit breaker and utility fault interrupter/isolator opening

136 Branch circuit breakers opening

138 Cover front door equipped with three point latch and concealed steel hinges. Door made of painted steel.

140 Flush, brushed stainless steel, cylinder tumbler lock with catches and spring-loaded door pulls

142 Branch circuit breaker directory frame and card with clear plastic covering on inside of door

144 Top and bottom endwall of panel cabinet

146 Service entrance concentric knockout (1", 1¼", 1½", 2") as alternate entrance to serve main circuit breaker

148 Typical concentric knockouts (½",¾") for complete flexibility of branch circuit conduit entrance into cabinet

150 Power section plated copper bus bars structure is assembled onto the interior pan in a single, vertical stack, supported continuously by molded polyester glass insulators. Two copper bus bars are part of the structure.

DESCRIPTION

FIG. 1—Legend

Figure 4:
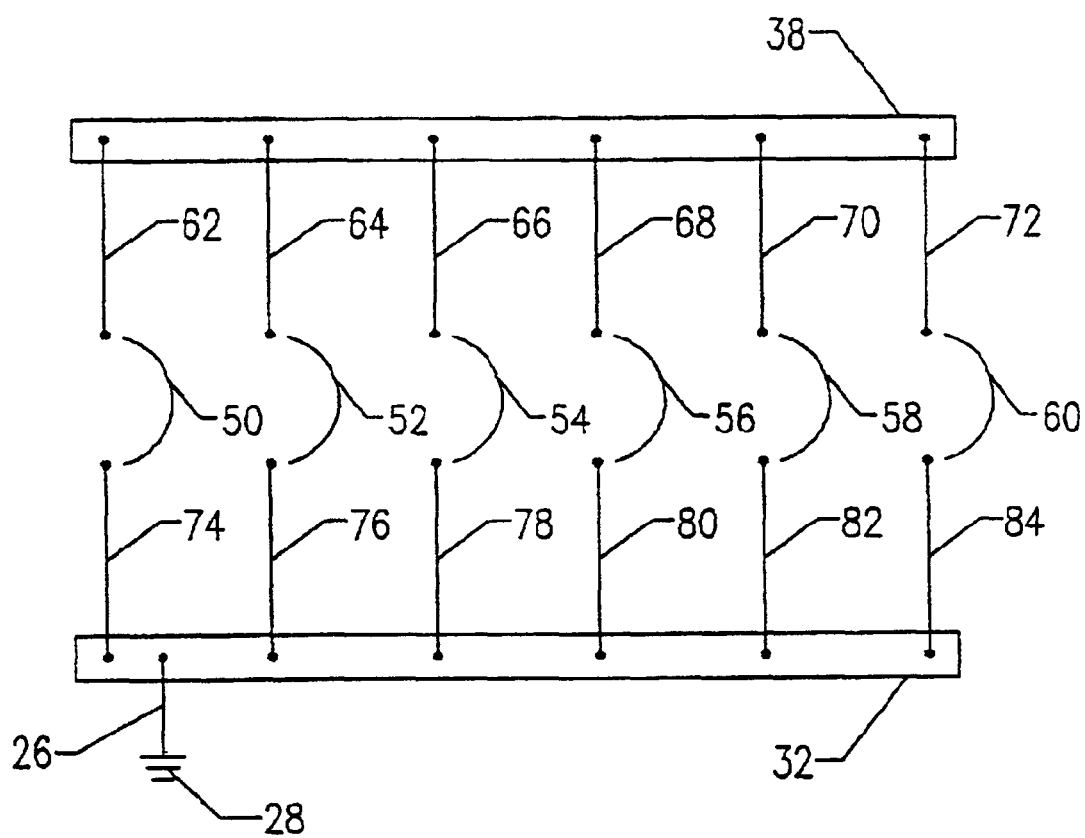
FIG. 4 show an electrical schematic of the means and method of providing overcurrent protection when two to six circuit breakers are used, as allowed by the National Electrical Code.
Figures 5A, 5B:
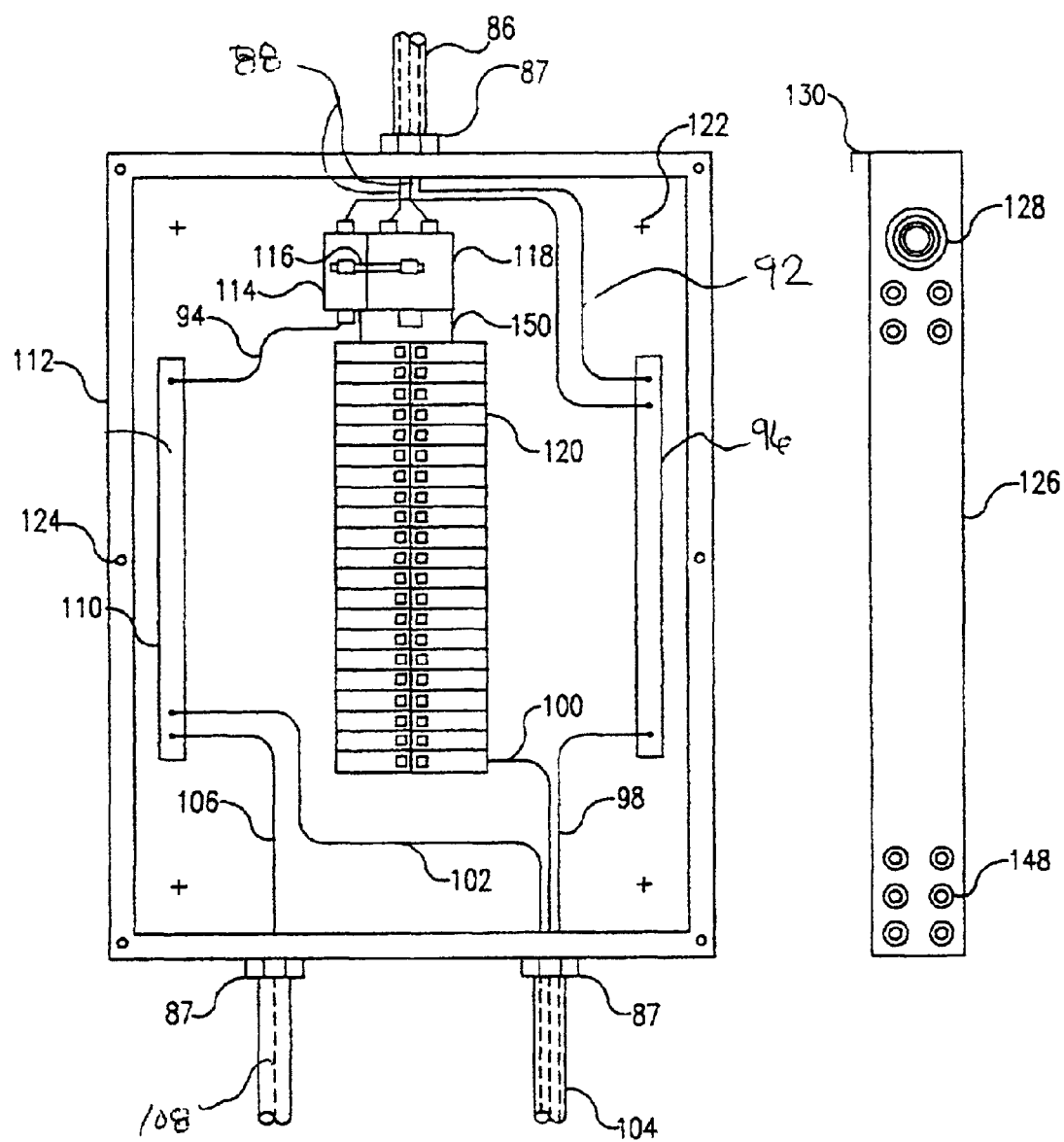
FIG. 5 shows an additional embodiment incorporating this invention a 120/240 volt, 200 ampere, single phase, 42 pole panelboard.
Figure 5C:
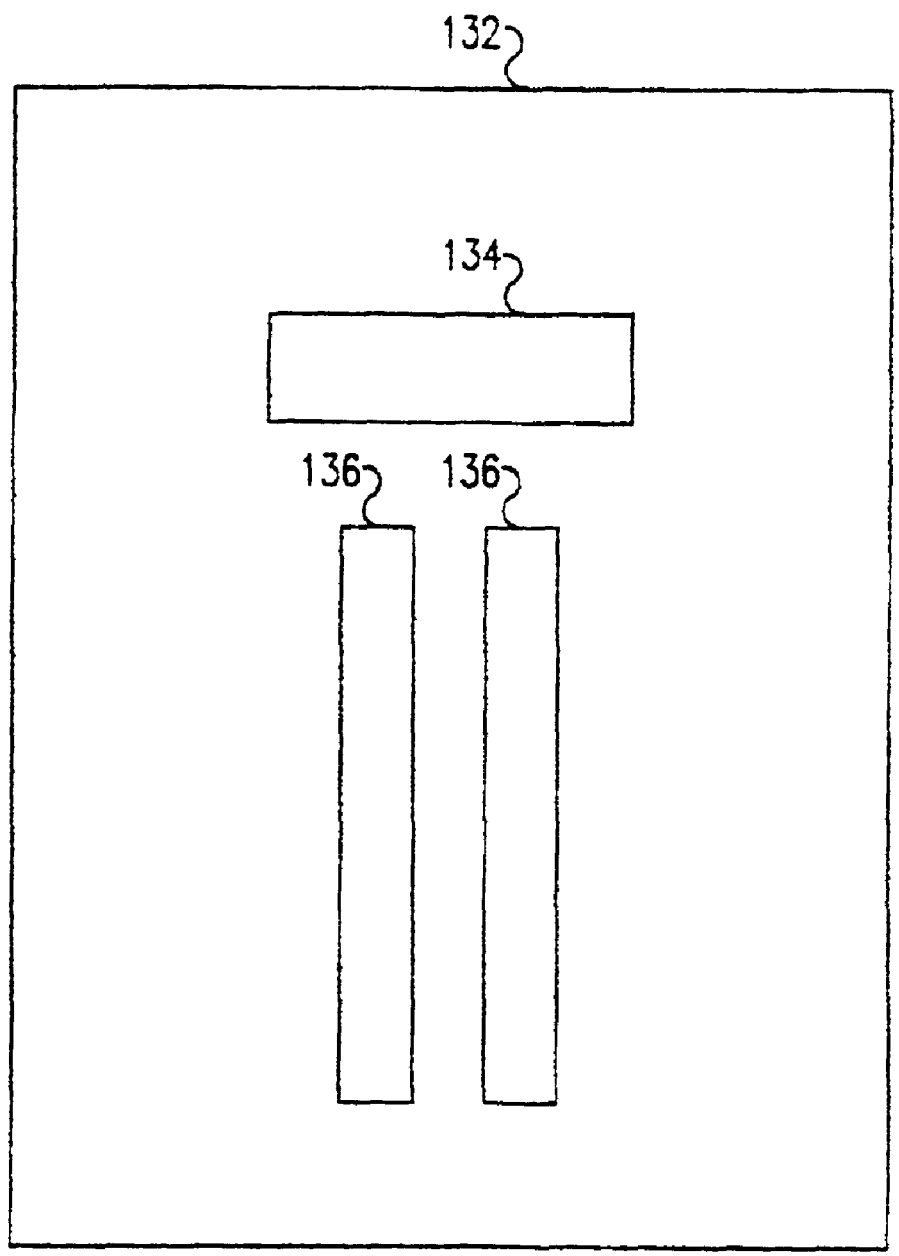
Figure 5D:
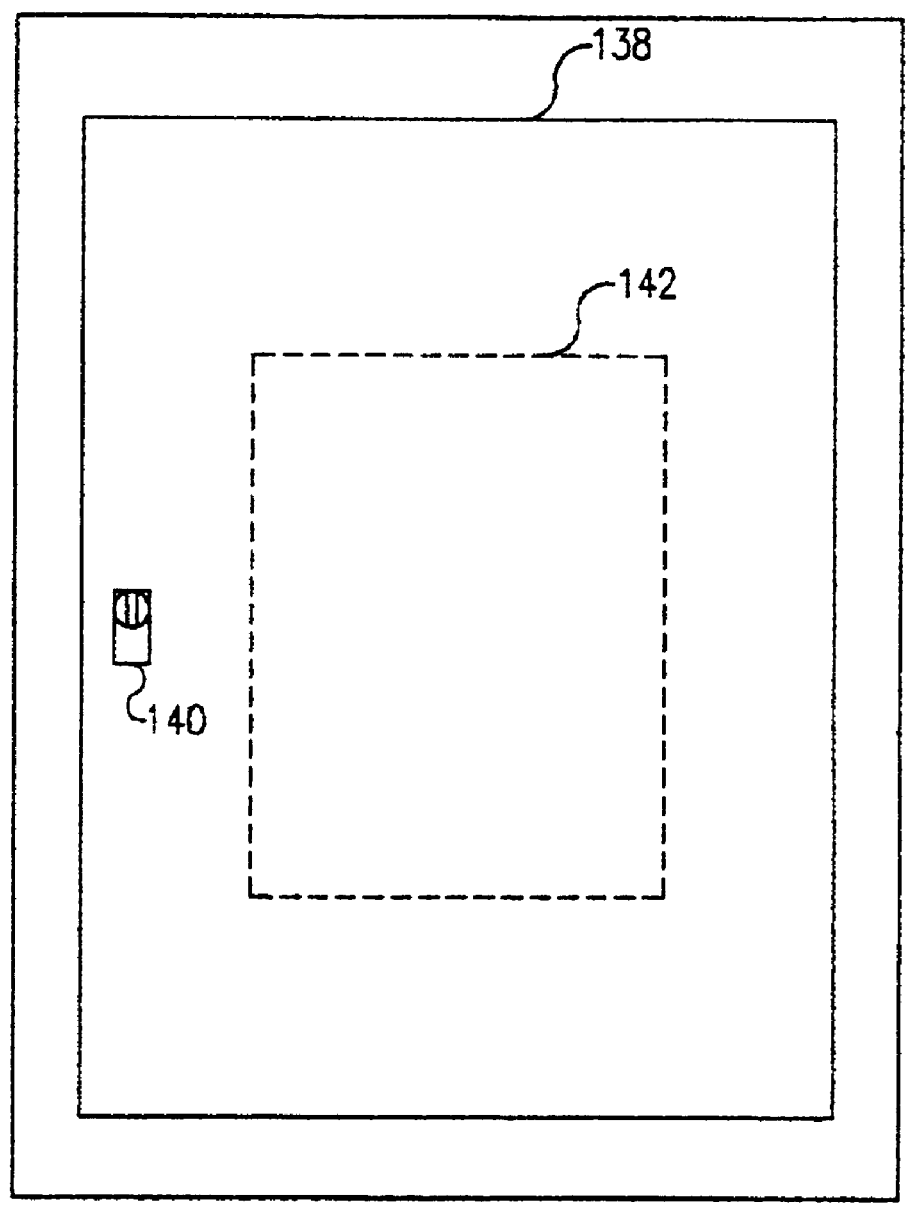
Figure 5E:
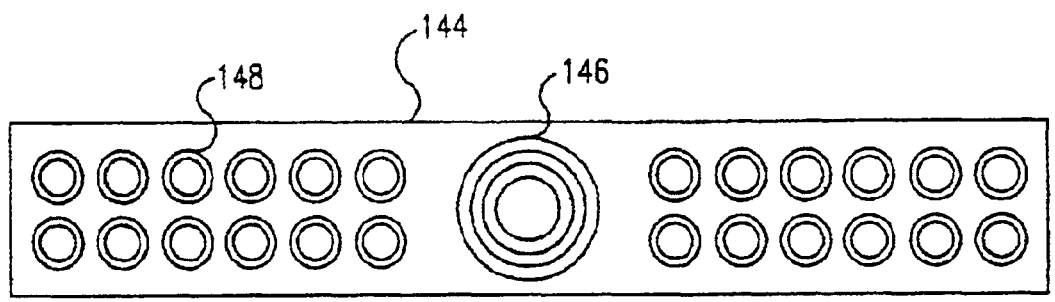
Figure 5F:
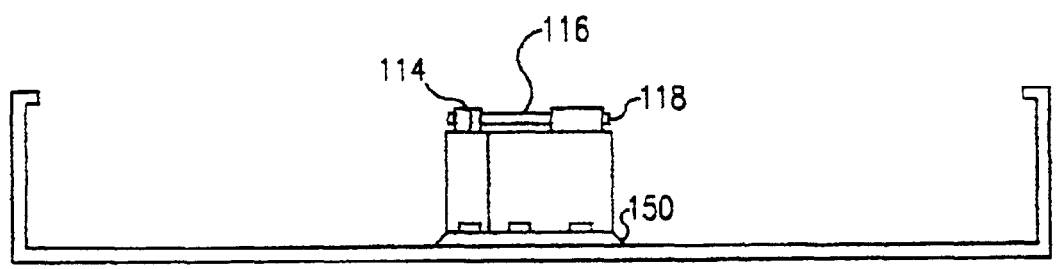

A legend is given with description of symbols used in FIG. 2 and FIG. 4 and for abbreviations used in FIG. 3. Both symbols and abbreviations are standard symbols and abbreviations used within the electrical industry and by electrical engineers.

FIG. 2—Preferred Embodiment

A preferred embodiment of the safe method of overcurrent protection for grounding electrode conductors is illustrated in FIG. 2. The schematic indicates an equipment enclosure 10 of service equipment, or of an enclosure of the first circuit breaker(s) downstream of a customer-owned transformer. It is understood that the phrases "service equipment" and "service equipment housing" include but are not limited to load centers, panel boards, switchboards, and breaker boxes. Within the enclosure is an insulated neutral bus/lug 38 connected to an equipment ground bus/lug 32, via a utility fault interrupter and isolator 18 interlocked with the other poles of the main circuit breaker 14 by a mechanical linkage 16. The service or transformer neutral 12 is connected directly to the bus/lug 38. The grounding electrode conductor 26 is not connected to the bus/lug 38, as is presently done in prior art. The enclosure 10 is bonded to the bus/lug 32.

Line No. 1 of a 240/120 volt/single phase/three wire system or Phase A of a three phase/four wire system conductor 20 is connected to a thermal-magnetic circuit breaker pole as in prior art. Line No.2 of a 240/120 volt/single phase/three wire system or Phase B of a three phase/four wire system conductor 40 is also connected to a thermal-magnetic circuit breaker pole, as in prior art. It is understood that the phrase "overcurrent protector" includes but is not limited to circuit breakers and fuses. Phase C of a three phase/four wire system conductor 42 is connected to a thermal-magnetic circuit breaker pole where the system is three phase/four wire. Conductor 42, Phase C load conductor 48, and Phase C circuit breaker pole 22 are only required where the system is three phase/four wire. Line No. 1 of a 240/120 volt/single phase/three wire system or Phase A of a three phase/four wire system conductor 44 is connected to the bus of a panelboard, switchboard, or to other electrical equipment downstream. Line No. 2 of a 240/120 volt/single phase/three wire system or Phase B of a three phase/four wire system conductor 46 is connected to the bus of a panelboard, switchboard, or to other electrical equipment downstream. Conductor 48 is connected to the bus of a panelboard, switchboard, or to other electrical equipment downstream.

FIG. 3—Table

FIG. 3 is a table giving the ampere rating of the utility fault interrupter/isolator for protection for the grounding electrode conductors. All acceptable conductors, of prior art as listed in Table 250-66 of the National Electrical Code are listed, along with the ampere rating of the utility fault interrupter/isolator for the given conductor. Ampere ratings are based on the ampacity of the conductor as given in Table 310-16 of the National Electrical Code. The ampere ratings and ampacities were selected using prior art applied to other conductors, but not applied to grounding electrode conductors. Conductors used for grounding electrode conductors have the same ampacities as the conductors listed in Table 310-16 of the National Electrical Code, and are in fact the same conductors. The ampere ratings selected are the same as or lower than the recognized ampacities of the conductors, assuring that the grounding electrode conductor does not overheat and ignite any adjacent combustible materials.

FIG. 4—Additional Embodiment A

FIG. 4 is an additional embodiment indicating the connections of additional utility fault interrupters/isolators where more than one circuit breaker serve as service disconnects as allowed by the National Electrical Code Section 230-71.

The Neutral bus/lug 38 is connected to the equipment ground bus/lug 32 via line side conductors 62, 64, 66, 68, 70, and 72 connected to utility fault interrupters/isolators 50, 52, 54, 56, 58, and 60 of the circuit breakers. Utility fault interrupters/isolators 50, 52, 54, 56, 58, and 60 are used in only the quantities necessary for the additional main circuit breakers used, up to a maximum of six as allowed by the National Electrical Code Section 230-71. Each utility fault interrupter/isolator is mechanically linked to the line or phase circuit breaker poles of the line or phase overcurrent trips of the circuit breaker. For example, if the system was a 240/120 volt/single phase/three wire system with six service disconnects or six main circuit breakers, each of the six main circuit breakers would be three-pole circuit breakers. One pole for the overcurrent protection of the grounding electrode conductor and two poles for overcurrent protection of the line conductors. All three poles would be mechanically linked so that all three poles trip in unison.

Conductors 74, 76, 78, 80, 82, and 84 are tap conductors on the load side of the utility fault interrupters/isolators to connect these poles to the equipment ground bus/lug 32. A single grounding electrode conductor 26 connects the bus/lug 32 to a grounding electrode 28. Tap and grounding electrode conductors are sized as required by Article 250 of the National Electrical Code, as is current practice.

If the service equipment has only one main circuit breaker and service disconnect, only Reference Numericals 38, 62, 50, 74, 32, 26, and 28 are used. If the service equipment has two main circuit breakers serving as service disconnects, only Reference Numericals 38, 62, 64, 50, 52, 74, 76, 32, 26, and 28 apply. If the service equipment utilizes three main circuit breakers as service disconnects, then only Reference Numericals 38, 62, 64, 66, 50, 52, 54, 74, 76, 78, 32, 26, and 28 apply. If the service equipment consists of four main circuit breakers as service disconnects, then all Reference Numericals apply except Reference Numericals 70, 72, 58, 60, 82, and 84. If the service equipment has five main circuit breakers as service disconnects, then all Reference Numericals apply except Reference Numericals 72, 60, and 84. If the service equipment has six circuit breakers serving as service disconnects, then all Reference Numericals are applicable.

The ampere rating of each utility fault interrupter/isolator is sized for the ampacity of the conductor 26 divided by the number of service disconnect circuit breakers or the ampacity of the tap conductors, whichever is smaller.

If the multiple main circuit breakers are within separate enclosures, as allowed by the National Electrical Code, then each enclosure would be bonded to the equipment ground bus/lug.

Taps on grounding electrode conductors are used in prior art as allowed by Article 250-64(d) of the National Electrical Code.

FIG. 4—Additional Embodiment B

FIG. 5 is an additional embodiment indicating how this invention is incorporated into a 200 ampere, 240/120 volt, single phase panelboard.

Advantages

From the description above, a number of advantages of my overcurrent protection method for grounding electrode conductors become evident:

(a) Positive overcurrent protection of the grounding electrode will prevent numerous fires that occur each year due to electric utility ground faults and other ground faults that result in zero sequence current returning to the system neutral via the grounding electrode conductor. Prior art did not provide any positive protection from electric utility ground faults and open neutrals.

(b) The method of connecting the grounding electrode conductor and circuit breaker, panelboard, or switchboard enclosures to the equipment ground bus/lug directly assures that the enclosure will be at ground potential at all times, even during ground faults and after the circuit breaker(s) have tripped. This feature allows individuals to safely handle and touch the enclosure and circuit breaker after the breaker has tripped to reset the circuit breaker.

(c) The mechanical linkage from the added grounded electrode conductor pole of the circuit breaker to the line or phase poles assures trippage of all poles during ground faults. This de-energizes all electrical equipment for safety reasons when the connection between the neutral and grounding electrode conductor is opened by the added grounding electrode conductor pole of the added breaker.

(d) Interrupting and ampere ratings of circuit breaker poles are adequate and readily available within the marketplace.

(e) Since the ampere rating of the circuit breaker pole on the grounding electrode conductor will be smaller than the line or phase circuit breaker pole ampere ratings, an additional level of safety from ground faults within the facility will be achieved.

Operation—FIG. 2

The manner of using the utility fault interrupter/isolator for overcurrent protection of the grounding electrode conductor is identical to the manner in which multiple poles of circuit breakers are used to provide overcurrent protection for line and phase conductors. Adequate interrupting ratings are readily available. The mechanical linkage 16 is the same linkage used today on multiple pole circuit breakers, usually in the form of handle ties.

When an overcurrent condition is sensed by the utility fault interrupter/isolator 18 for a single circuit breaker, the multiple pole circuit breaker 14 trips, opens the connection between the grounding electrode conductor 26 and the neutral bus/lug 38, and opens all line or phase conductors. This interrupts the zero sequence current path to the system neutral and prevents an overcurrent situation on the grounding electrode conductor. This also de-energizes all electrical service to the facility.

The mechanical linkage 16 assures that all poles of the circuit breaker open, even if only one pole senses an overcurrent. This is required to de-energize the facility if the grounding electrode conductor to neutral path is opened for any reason and to comply with Article 230-90(b) of the National Electrical Code.

The bus/lug 38 is insulated from the enclosure 10 to eliminate a zero sequence current path from the grounding electrode conductor, to the enclosure, and to the neutral. An uninsulated neutral bus/lug would prevent the invention from working properly.

The conductor 26 is not connected directly to the bus/lug 38, but is connected via the utility fault interrupter/isolator 18, so that the zero sequence current path between grounding electrode 28 and the neutral can be opened. Interrupting ratings of the utility fault interrupter/isolator would be selected based upon the maximum ground fault current available at the installation as is presently done for phase or line overcurrent devices.

The enclosure 10 is bonded to the equipment ground bus/lug 32 with a bonding conductor 30 to keep the enclosure at ground potential at all times, including after the tripping of the circuit breaker 14, when someone will go to the enclosure to reset the circuit breaker. This prevents that person from being shocked or electrocuted. Even if the ground fault still exists, the enclosure and circuit breaker are safe to touch.

Equipment grounding conductors 24 are connected at all times to the bus/lug 32, to assure that at all times the grounded equipment within the facility is grounded.

Operation—FIG. 4

The manner of using the additional utility fault interrupters/isolators on multiple line or phase circuit breakers to protect from overcurrents on the grounding electrode conductor is identical to that described above in FIG. 2, except that: (1) multiple utility fault interrupters/isolators are used, (2) tap conductors are used to connect the individual utility fault interrupters/isolators between the neutral bus/lug 38 and the equipment ground bus/lug 32, and (3) the ampere rating is sized for the ampacity of grounding electrode conductor divided by the number of main circuit breakers or the ampacity of the tap conductors, whichever is smaller.

When an overcurrent is sensed on any of the utility fault interrupters/isolators, the circuit breaker trips, opening all poles of the circuit breaker whose utility fault interrupter/isolator sensed the overcurrent. The other circuit breakers remain closed until their individual utility fault interrupter/isolator senses an overcurrent. Once all utility fault interrupters/isolators have sensed an overcurrent and tripped, the fault current path from neutral to grounding electrode is opened and all the electricity to the facility is turned off.

When individual utility fault interrupters/isolators trip, the portion of the fault current flowing through these tripped poles begins to flow in the non-tripped utility fault interrupters/isolators and will cause the other utility fault interrupters/isolators to trip, if an overcurrent still exists. Individual mechanical linkages trip all poles of each main circuit breaker.

Conclusion, Ramifications, and Scope

Accordingly, the reader will see that the method and apparatus for interrupting electric utility ground and open neutral fault currents of this invention can easily be manufactured using readily available equipment. This invention will add a level of electrical safety not achieved by prior art and will prevent fires and deaths due to overcurrents on grounding electrode conductors.

The scope of this invention should be determined by the appended claims and their legal equivalents, rather than by the examples given.

What is claimed is:

1. A service equipment housing, comprising:
   a neutral bus;
   a ground bus;
   a first overcurrent protector;
   a first conductor electrically connecting said neutral bus and said first overcurrent protector; and
   a second conductor electrically connecting said ground bus and said first overcurrent protector.

2. The service equipment housing of claim 1, wherein said overcurrent protector is selected from the group consisting of a circuit breaker and a fuse.

3. The service equipment housing of claim 1, wherein said overcurrent protector comprises a thermal-magnetic circuit breaker.

4. The service equipment housing of claim 1, wherein said overcurrent protector comprises a single pole, 120 volt, thermal-magnetic circuit breaker.

5. The service equipment housing of claim 1, further comprising:
   a first grounding electrode; and
   a first grounding electrode conductor, said first grounding electrode conductor electrically connecting said ground bus and said grounding electrode.

6. The service equipment housing of claim 5, wherein said overcurrent protector comprises a single pole, 120 volt, thermal-magnetic circuit breaker.

7. The service equipment housing of claim 1, further comprising:
   a second overcurrent protector;
   a first hot service entrance conductor, said first hot service entrance conductor being electrically connected to said second overcurrent protector; and
   a first neutral service entrance conductor, said first neutral service entrance conductor being electrically connected to said neutral bus.

8. The service equipment housing of claim 7, wherein:
   said second overcurrent protector comprises a circuit breaker;
   said first hot service entrance conductor comprises a first wire; and
   said first neutral service entrance conductor comprises a second wire.

9. The service equipment housing of claim 7, further comprising:
   a third overcurrent protector; and
   a second hot service entrance conductor, said second hot service entrance conductor being electrically connected to said third overcurrent protector.

10. The service equipment housing of claim 9, wherein said first, second, and third overcurrent protectors comprise first, second, and third circuit breakers.

11. The service equipment housing of claim 9, wherein said first, second, and third overcurrent protectors comprise
   first, second, and third circuit breakers, having first, second, and third poles, respectively; and further comprising;
   a handle, said handle mechanically connecting said first, second, and third poles.

12. The service equipment housing of claim 7, further comprising:
   a third overcurrent protector;
   a fourth conductor electrically connecting said neutral bus to said third overcurrent protector; and
   a fifth conductor electrically connecting third overcurrent protector to said ground bus.

13. A service equipment housing, comprising:
   a two pole main circuit breaker;
   first and second wires, comprising hot, line-side wires, said first and second wires being electrically connected to said main circuit breaker;
   first and second branch circuit breakers;
   a third wire, said third wire electrically connecting said main circuit breaker and said first branch circuit breaker;
   a fourth wire, said fourth wire electrically connecting said main circuit breaker and said second branch circuit breaker;
   a neutral bus;
   a fifth wire, said fifth wire comprising a neutral, line-side wire, said fifth wire being electrically connected to said neutral bus;
   a one pole circuit breaker;
   a sixth wire, said sixth wire electrically connecting said neutral bus and said one pole circuit breaker;
   a ground bus; and
   a seventh wire, said seventh wire electrically connecting said one pole circuit breaker and said ground bus.

14. The service equipment housing of claim 13, further comprising:
   a grounding electrode; and
   an eighth wire, said eighth wire electrically connecting said ground bus and said grounding electrode.

15. The service equipment housing of claim 14, further comprising a handle, said handle mechanically linking said one pole of said one pole circuit breaker to said two poles of said two pole main circuit breaker.

16. The service equipment housing of claim 15, further comprising:
   a ninth wire, said ninth wire comprising a hot, load side wire, said ninth wire being electrically connected to said first branch circuit breaker;

a tenth wire, said tenth wire comprising a neutral, load side wire, said tenth wire being electrically connected to said neutral bus; and an eleventh wire, said eleventh wire comprising a ground, load side wire, said eleventh wire being electrically connected to said ground bus.

17. The service equipment housing of claim 16, wherein:

said two pole main circuit breaker comprises a 200 ampere two pole, 240 volt, thermal-magnetic circuit breaker; and said one pole circuit breaker comprises a 60 ampere, one pole, 120 volt thermal-magnetic circuit breaker.

18. A method of protecting a grounding electrode conductor from an overcurrent, comprising:

electrically connecting a grounding electrode to a ground bus using a first grounding electrode conductor;

electrically connecting said ground bus to a first circuit breaker using a first bonding conductor;

electrically connecting said first circuit breaker to a neutral bus using a second bonding conductor;

electrically connecting a line side, neutral wire to said neutral bus.

19. The method of claim 18, further comprising:

securing a handle between said first circuit breaker and a second circuit breaker so that when said first circuit breaker is tripped, said handle trips said second circuit breaker.

20. The method of claim 19, wherein said first circuit breaker comprises a 60 ampere, single pole, 120 volt thermal-magnetic circuit breaker having a short circuit rating of 10,000 RMS symmetrical amperes interrupting capacity; and further comprising:

passing an overcurrent from soil, through said grounding electrode, said grounding electrode conductor, said ground bus, said first bonding conductor, and said first circuit breaker; and tripping said first circuit breaker when said overcurrent exceeds said interrupting capacity of said first circuit breaker.

\* \* \* \* \*